ANTENNA SYSTEM

Filed Dec. 26, 1961 3 Sheets-Sheet 1

INVENTORS C.C. CUTLER
R. KOMPFNER
L.C. TILLOTSON

BY [signature]
ATTORNEY

INVENTORS C. C. CUTLER
R. KOMPFNER
L. C. TILLOTSON

BY [signature]

ATTORNEY

ANTENNA SYSTEM

Filed Dec. 26, 1961 3 Sheets-Sheet 3

INVENTORS C. C. CUTLER
R. KOMPFNER
L. C. TILLOTSON
BY W. Adams, Jr.
ATTORNEY

United States Patent Office 3,273,151

Patented Sept. 13, 1966

3,273,151

ANTENNA SYSTEM

Cassius C. Cutler, Gillette, Rudolf Kompfner, Middletown, and Le Roy C. Tillotson, Holmdel, N.J., assignors to Bell Telephone Laboratories, Incorporated, New York, N.Y., a corporation of New York Filed Dec. 26, 1961, Ser. No. 162,165.
13 Claims. (Cl. 343—100)

This invention relates to antenna systems and, more particularly, to a multiple element antenna system having a directional radiation pattern dependent upon the direction of incident electromagnetic waves and to associated circuitry for adapting such an antenna system to use in communication repeaters.

Patent 2,908,002, issued October 6, 1959, to L. C. Van Atta discloses a multiple element antenna system which retransmits an electromagnetic wave impinging upon the antenna array in the direction to the source of the incoming wave. An even number of antenna elements is called for and the elements are equally spaced about a center of symmetry in a planar array. Corresponding elements on either side of the center of symmetry are paired off and connected together with transmission lines each having equal electrical lengths, hence equal transmission delay. By virtue of this arrangement, as in a corner reflector, the path lengths for all rays of the impinging electromagnetic wave from an arbitrary wavefront to the array elements, through the transmission lines to the corresponding array elements, and from the corresponding array elements back to the arbitrary wavefront are equal over a range of directions of impinging electromagnetic waves. This condition results in constructive interference of the electromagnetic waves radiated by the various elements in the direction to the source of the incoming wave and consequently, a highly directional composite antenna radiation pattern the direction of radiation of which is dependent upon the direction of the incident wave.

The so-called Van Atta array has been received with much enthusiasm in the communication art, and already several important applications utilizing the Van Atta array's favorable qualities have been proposed. It has been recognized, for example, that the Van Atta array will permit highly directional antenna operation between communication stations whose relative attitude is subject to change or between a fixed station and several other fixed stations communicating alternately with the first fixed station. The directional antenna characteristics and the many signal paths connected essentially in parallel, in turn, make possible the use of certain electronic devices having low power capabilities which might otherwise not be conveniently utilized, namely solid state amplifiers, in order to exploit their properties of light weight, high power efficiency, and long life. The reliability of such a system is also very high due to the parallel connection of many identical signal paths, failure of a number of which will not appreciably impair performance of the station.

R. C. Hansen in an article in the Proceedings of the IRE, June 1961 issue, at page 1066, entitled "Communication Satellites Using Arrays," suggests that the Van Atta array may be employed to advantage in a space satellite communication repeater station and considers some of the features of the Van Atta array discussed above in light of the problems encountered in satellite communications. Hansen points out that directional antenna operation may be obtained in a satellite unstabilized in attitude by covering the satellite body with array elements and using the array much as a corner reflector to communicate between two points on earth. The electromagnetic wave reflected from the satellite, although directed at the earth transmitter, is designed to spread owing to diffraction to include the earth receiver within its field of illumination.

The Van Atta array can be used to advantage in many other communications systems where the relative orientations of communication stations vary, as for example, mobile radio, radar, or even systems conventionally thought of as being fixed, such as terrestrial line-of-sight radio relay systems where environmentally caused deflections of the high towers upon which the repeater antennas are mounted ordinarily limit the directionality permitted of these antennas.

The Van Atta array is, however, subject to certain inherent limitations which severely restrict its application. The antenna elements are required to be arranged or placed in a planar array and symmetry between corresponding array elements must be maintained in order to obtain the corner reflector effect. Furthermore, the necessity for electrical connections between pairs of the array elements proves awkward in some circumstances in which it would be desirable to exploit the favorable characteristics of the Van Atta array.

Some of the shortcomings of the Van Atta array become apparent, for example, in attempting to utilize it in space satellite communication repeater stations, as suggested by Hansen above. One of the foremost advantages of using the Van Atta array in satellite communications is that if array elements are distributed over the satellite body to give isotropic antenna coverage little or no attitude stabilization would then be required to carry on directional transmission with earth. But it is difficult to implement isotropic antenna coverage of the satellite body by means of planar arrays so that it may remain unstabilized and, therefore, resort would most likely be taken, as did Hansen, to many small nonplanar arrays. This results in deviations in the angle of the retransmitted wave from that of the received wave. The spread of the transmitted beam must be made still wider, thus reducing the antenna gain, to insure that the earth receiver station remains within the field of illumination of the satellite antenna system despite these deviations.

It is, therefore, the object of the present invention to provide a multiple element antenna system that possesses the favorable characteristics of the so-called Van Atta array, while not being subject to the limitations and disadvantages of the Van Atta array, and to provide associated circuits for adapting such an antenna to use in radio repeater applications.

In accordance with the above object, plural independent antenna elements are arranged without regard to placement relative to one another, either laterally or in depth. Each antenna element intercepts the incoming electromagnetic wave in different phase relative to the other elements, that phase being dependent upon the angle of incidence of the incoming wave. A signal corresponding to each antenna element is developed having a phase with respect to the output of a common reference source proportional and opposite to the phase of the portion of the incoming wave intercepted by the corresponding antenna element with respect to the output of the common reference source. These signals are produced by beating each of the intercepted electromagnetic waves with the reference source output, which oscillates at a higher frequency than the incoming wave, in a mixer. The difference frequently modulation sidebands that result tend to cancel the phase differences incurred by the electromagnetic waves in recepcoming wave, in a mixer. The difference frequency modulation sidebands are separated and radiated, each by its corresponding element, thus combining to form a highly directional electromagnetic wave in a direction related in general to the direction to the source of the incoming wave. In the special case in which the frequency of the transmitted and received signals are of the same order, a condition created by selecting the frequency of the reference source equal to twice the frequency of the incoming wave, transmission takes place in a direction coinciding with the direction to the source of the incoming wave.

If the frequency of the transmitted signal is greatly different from the frequency of the received signal the antenna elements each require separate units for transmitting and receiving, scaled in placement or separation with respect to each other in direct proportion to the ratio of the wavelength of the transmitted wave to the wavelength of the received wave, in order for the transmitted signals to combine in the direction to the source of the received wave. This may be accomplished on a curved array according to another feature of the invention by extending both the receiving and transmitting unit of each antenna element radially and coaxially from a center point at different radial distances.

A difference in frequency between the transmitted and received signals may be alternatively taken into account by multiplying the frequency of the newly-developed direction-indicating signal generated for each antenna element in the ratio of the wavelength of the received wave to the wavelength of the transmitted wave.

According to another feature of the invention, the above multiple element antenna system is adapted for use in a relatively movable, two-way repeater exchanging information between first and second remote communication stations. The direction of transmission of electromagnetic waves from the repeater required to communicate with each station is indicated by the electromagnetic wave intercepted in the repeater from that station. In each of the repeater branches, of which there is one for each antenna element, the electromagnetic wave received from a station is separated into an information-bearing component and a direction-indicating (i.e., indicating the direction to the station transmitting the electromagnetic wave), component. As above, two signals are developed each having a phase which is proportional and opposite to the phase of the direction-indicating signal from a different one of the stations with respect to a common reference source. Each of these signals is combined with the information-bearing signal transmitted to the repeater from the other of the stations and then applied to the antenna element for transmission. In this way, the information-bearing signals are applied to the various antenna elements in the proper phase relationships to effect directional transmission of each to the other station thus bringing about an exchange of information between the first and the second stations.

Each repeater branch, as described above, is capable of functioning only when receiving signals from both remote stations at the same time. This is true because in order to develop each signal for transmission in the repeater, both the direction-indicating component of one station and the information-bearing component of the other station must be present. In another embodiment of the invention, this limitation is eliminated by combining the information-bearing signals from a remote station and beating the combined information-bearing signal with the direction-indicating signal of the other station. In this case, so long as a direction-indicating component is present at a particular antenna element the information-bearing signal will be transmitted to the station transmitting the direction-indicating component from that antenna element.

The above and other features of the invention will be considered in detail in the following specification taken in conjunction with the drawings in which.

Antenna arrays generally can be made to transmit electromagnetic waves in any direction within the radiation pattern of the individual antenna elements comprising the array by exciting the elements with the same signals presented to the elements in proper phase relationship with respect to one another. Constructive wave interference occurs along some angle with respect to the array, according to the phasing introduced, with the result that a beam of radiation is produced in that direction. Because of the reciprocity between transmission and reception that exists in antennas, the phase relationship between the portions of an electromagnetic wave intercepted by the antenna elements impinging upon the antenna from a given direction is equal and opposite to the phase relationship between the portions of an electromagnetic wave of the same frequency required for transmission from the corresponding antenna elements in the given direction.

Figures 1, 5, 7:
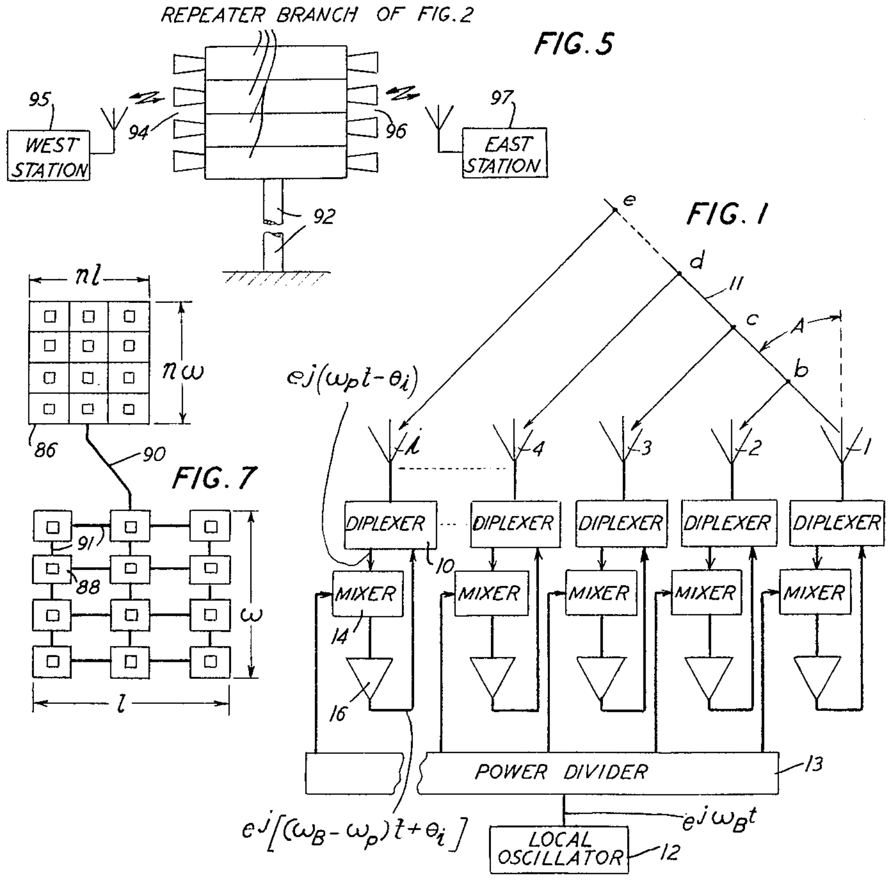
FIG. 1 is an elementary schematic diagram in block form of the multiple antenna system of the invention.
FIG. 5 illustrates an antenna array of the invention employed as a terrestrial repeater mounted on top of a tower.
FIG. 7 shows a three-dimensional, planar antenna array having corresponding transmitting and receiving units for each antenna element in two separate banks.

In FIG. 1 plural antenna elements 1, 2, 3, 4 . . . *i*, comprising an array are shown. Although shown equally spaced and arranged in a planar array to simplify the following description, the placement of the elements in practicing the invention is really immaterial, as is the type of individual antennas employed. For the purpose of illustrating the mode of operation of the arrangement, an incoming electromagnetic wave impinging upon the array at an angle A is considered at a point where its wavefront, signified by a line 11, contacts antenna element 1. From FIG. 1 it is apparent that wavefront 11 at this point has a distance remaining to travel in order to contact elements 2, 3, 4 . . . *i*. As a result, the electromagnetic signal intercepted by each antenna element slightly lags in phase the electromagnetic signal intercepted by the preceding, lower number antenna element. The phase lag of the signal intercepted by each antenna element with respect to the signal intercepted by antenna element 1 is given by the equation $$B_i=\frac{2\pi d_{1-i}}{\lambda}\cos A$$

where $B_i$ is the phase lag of antenna element $i$, $d_{1-i}$ is the distance between antenna elements $l$ and $i$, $\lambda$ is the wavelength of the incoming electromagnetic wave, and A is the angle that the wavefront of the incoming electromagnetic wave forms with the normal to the array at antenna element 1.

In the following discussion, the phase and frequency of the signals considered are the only characteristics of interest because it is these parameters that determine how the electromagnetic waves from the various antenna elements will combine. To illustrate these relationships the phase and frequency of the signals will, according to common practice, be designated $e^{j(\omega t+\theta)}$ where $\omega$ is $2\pi$ times the frequency of the signal, $t$ is time, and $\theta$ is the phase of the signal, with the signal magnitude eliminated for simplicity. It will be understood that what is meant is either the real part or the imaginary part of $e^{j(\omega t+\theta)}$.

In the following description the operation of antenna element $i$ is explained with the understanding that it is exemplary of the operation of each antenna element and that $i$ is a variable that may be replaced by any of the integers 1, 2, 3, 4, . . . The signal intercepted by antenna element $i$, $e^{j(\omega_p t-\theta_i)}$, where $\omega_p$ is $2\pi$ times the frequency of the incoming signal and $\theta_i$ is the phase of the electromagnetic wave intercepted by antenna element $i$ relative to an arbitrary phase reference, is applied to a diplexer 10, which could be a waveguide hybrid as shown in FIG. 9.5–3 at page 339 of Principles and Applications of Waveguide Transmission by G. C. Southworth, D. Van Nostrand Company, Inc., 1950. The signal extracted by diplexer 10 is beat with the output from a local oscillator 12, $e^{j\omega_B t}$, where $\omega_B$ is $2\pi$ times the frequency of local oscillator 12 and approximately twice $\omega_p$, in a mixer 14. The output of oscillator 12 is made available to the mixer of each branch by means of a power divider 13. Accordingly, modulation sidebands are generated, one of which is the difference frequency $$e^{j\omega_B t}$$

$$e^{j[(\omega_B-\omega_p)t+\theta_i]}$$

This modulation sideband is near the frequency of the incoming signal and has a phase approximately equal and opposite to the received signal with respect to the phase reference. The relative phase relationship between the signals applied to the different antenna elements necessary to produce transmission by the array in the direction of reception is given by the above difference frequency sideband. This sideband of mixer 14 is therefore filtered out and amplified by a narrow band amplifier 16, the output of which is applied to diplexer 10 for transmission on antenna element *i* in combination with the signals transmitted by the remaining antenna elements in the direction to the source of the incoming wave.

The mode of operation of the antenna array can be described qualitatively as follows: Each antenna element in order, i.e., 1, 2, 3, 4, . . . *i*, picks up the incoming electromagnetic wave with an additional increment of phase lag relative to an arbitrary reference phase, e.g., that of the portion picked up by element 1. The beating operation produces for radiation from each antenna element in order an electromagnetic wave with an additional increment of phase lead relative to the reference phase, equal in magnitude to the phase lag incurred in reception of the incoming wave by the element. Thus in-phase radiation from all the antenna elements occurs in the direction to the source of the incoming electromagnetic wave.

The frequency of local oscillator 12, $\omega_B/2\pi$, is selected to be approximately twice the frequency of the incoming signal, $\omega_p/2\pi$, so that the frequency of the transmitted signal is nearly equal to that of the received signal. Therefore, the equation in column 4 yields equal, but opposite phase shifts for both transmission and reception, and transmission takes place in the direction to the source of the received signal. Measures to overcome this limitation upon the frequency of the transmitted and received signals, applicable as well to the antenna of FIG. 1, will be described hereinafter. On the other hand, it may be desired in some applications of the apparatus in FIG. 1 to transmit in some direction other than, but related to, the direction to the source of the received signal. In this case, by setting the frequency of the transmitted signal different from that of the received signal and/or by providing separate transmitting and receiving antenna elements different distances apart, the equation in column 4 would yield different phase shifts for transmission and reception.

Figure 2:
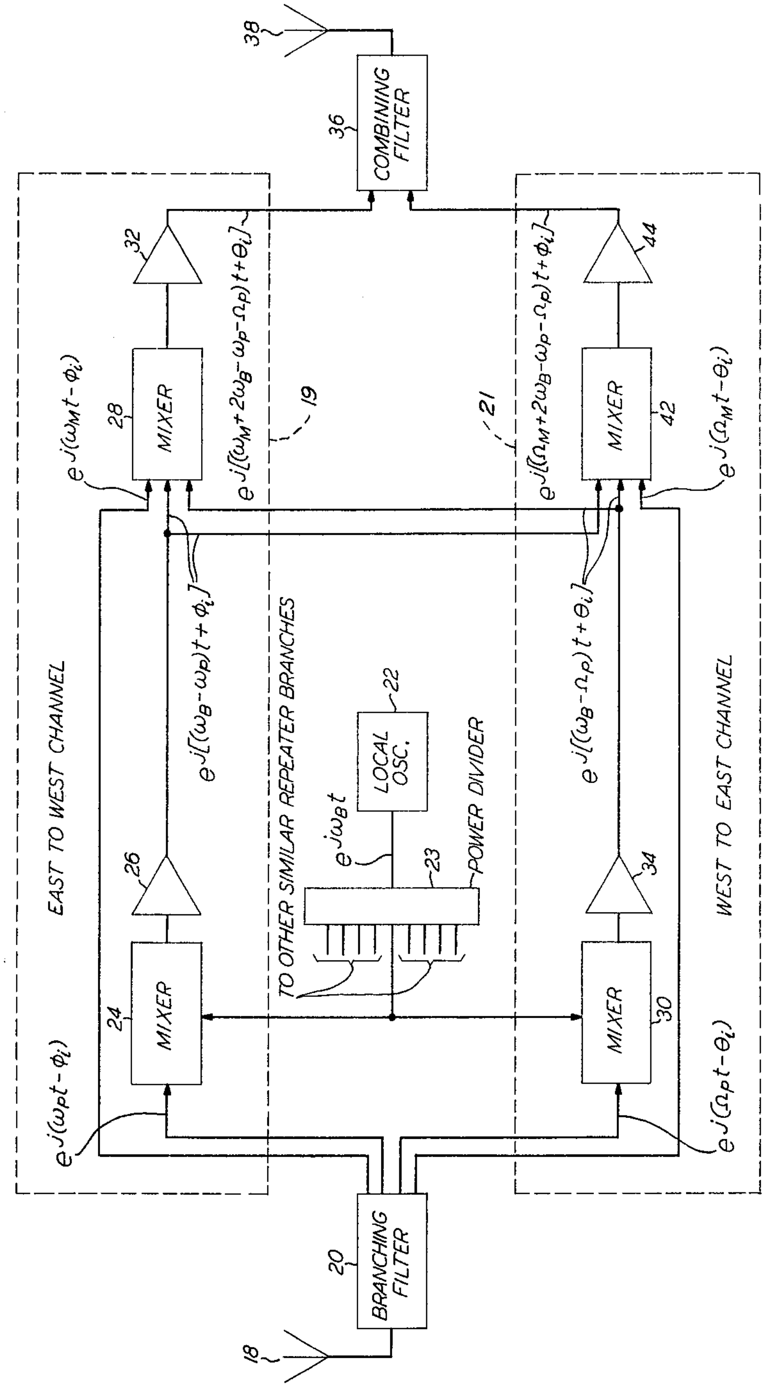
FIGS. 2 and 3 are schematic diagrams in block form of circuitry adapting the antenna system of the invention for use in radio repeaters.

FIG. 2 illustrates one embodiment of associated circuitry for adapting the antenna system of the invention for use as a communication repeater operating to exchange information modulated upon electromagnetic waves between terminal or other repeater communication stations to be designated an east station and a west station. Of course, the repeater circuitry shown can be expanded to accommodate any number of terminal stations. Each antenna element of the repeater requires a repeater branch identical to that shown, and consequently the branches are essentially connected in parallel. If some branches should fail for some reason, the repeater would continue to function without the disabled branches and, hence, the repeater reliability is enhanced by virtue of this arrangement.

A receiving unit 18 of the antenna element intercepts the incoming information signals from the east and west stations. A branching filter 20 which may be a circuit of the type disclosed in Fig. 9.2–25 at page 314 of Principles and Applications of Waveguide Transmission, referred to above, separates the various signals. An east station direction-indicating signal, represented by $$e^{j(\omega_p t-\Phi_i)}$$

where $\omega_p$ is $2\pi$ times the frequency of a pilot signal from the east station and $\Phi_i$ is the phase of the east transmitted electromagnetic wave intercepted by the particular antenna element relative to a phase reference and an east station information-bearing signal, represented by $$e^{j(\omega_m t-\Phi_i)}$$

where $\omega_m$ is $2\pi$ times the center frequency of the information signal transmitted from the east station, are abstracted by branching filter 20 for application to an east-to-west channel 19. Similarly, a west station direction-indicating signal, represented by $$e^{j(\Omega_p t-\theta_i)}$$

where $\Omega_p$ is $2\pi$ times the frequency of the pilot signal from the west station and $\theta_i$ is the phase of the west transmitted electromagnetic wave intercepted by the particular antenna element relative to the same phase reference, and a west station information-bearing signal, represented by $$e^{j(\Omega_m t-\theta_i)}$$

where $\Omega_m$ is $2\pi$ times the center frequency of the information signal transmitted from the west station, are abstracted by branching filter 20 for application to a west-to-east channel 21. The pilot signal may consist of a separate signal transmitted from the remote station or for some types of modulation systems a portion of the carrier of the information-bearing signal with the modulation removed by a high-Q filter located in the direction-indicating signal branch of branching filter 20.

In east-to-west channel 19 the direction-indicating signal from the east station is beat with the output from a local oscillator 22, $$e^{j\omega_B t}$$

where $\omega_B$ is $2\pi$ times the frequency of local oscillator 22 and is larger than $\omega_p$ and $\Omega_p$, in a mixer 24. As indicated in FIG. 2, the output of local oscillator 22 is applied through a power divider network 23 to each of the repeater branches, of which there is one for each array element, to provide a common reference signal for all the repeater branches. To improve the system reliability, local oscillator 22 could be replaced with separate oscillators for each repeater branch, all synchronized in phase. Then the whole operation of the repeater system is not dependent upon the operation of a single local oscillator 22.

The difference frequency modulation sideband produced in mixer 24, represented by $$e^{j[(\omega_B-\omega_p)t+\Phi_i]}$$

is selected and amplified by a narrow band amplifier 26 and applied to a mixer 28 along with the information-bearing signal from the east station and the difference frequency modulation sideband, $$e^{j[(\omega_B-\Omega_p)t+\theta_i]}$$

produced in west-to-east channel 21 in a mixer 30 from the output of local oscillator 22 and the west station direction-indicating signal, and selected and amplified by a narrow band amplifier 34. The modulation sideband $$e^{j[(\omega_m+2\omega_B-\omega_p-\Omega_p)t+\theta_i]}$$

generated in mixer 28 is separated and amplified for retransmission in an amplifier 32. This signal contains the information from the east station, represented by $\omega_m$, to be transmitted to the west station and the phase angle providing directional transmission to the west station when cooperating with the other antenna elements, represented by $\theta_i$, and therefore is applied to a combining filter 36, which may be the type suggested for branching filter 20 used in reverse, for radiation toward the west station by a transmitting unit 38 of the antenna element. In analogous fashion, in west-to-east channel 21, a modulation sideband $$e^{i[(\Omega_m+2\omega_B-\omega_p-\Omega_p)t+\Phi]}$$

is produced in a mixer 42 from the information-bearing signal from the west station, the direction-indicating signal from the west station, and the difference frequency modulation sideband produced in mixer 24 in east-to-west channel 19. This signal carries the information from the west station, represented by $\Omega_m$, to be transmitted to the east station and the phase angle providing directional transmission to the east station when cooperating with the other antenna elements, represented by $\Phi_i$. Therefore, it is also applied through a narrow band amplifier 44 to combining filter 36 for radiation from transmitting unit 38 of the antenna element toward the east station.

It will be desirable in most repeater situations to separate by a great deal the frequency of operation of the transmitted signals and the received signals to reduce cross talk between them. In this instance, since phase angles $\Phi_i$ and $\theta_i$ correspond to the phase angles of the various antenna elements required to transmit a signal in the frequency range of the received signal in the direction to the source of received signals (see the equation in column 4), it will be necessary to employ separate transmitting and receiving units on each antenna element as shown in FIG. 2, and to scale the distance between the receiving units of the antenna elements with respect to the distance between transmitting units of the antenna elements in proportion to the ratio of wavelength of the received signal with respect to that of the transmitted signal. In general, as shown in FIG. 7, in order to do this, two completely separate banks of antenna units 86 and 88 would be required and interconnections between the corresponding units of each, as symbolized by a cable 90 and leads 91, are necessitated. If it is assumed that the received signal is of a higher frequency than the transmitted signal and $n$ is the ratio between the wavelength of the received to transmitted signals, the dimensions of transmitting bank 88 are represented by $l$ and $w$ and the scaled down dimensions of receiving bank 86 are represented $nl$ and $nw$.

Figure 4:
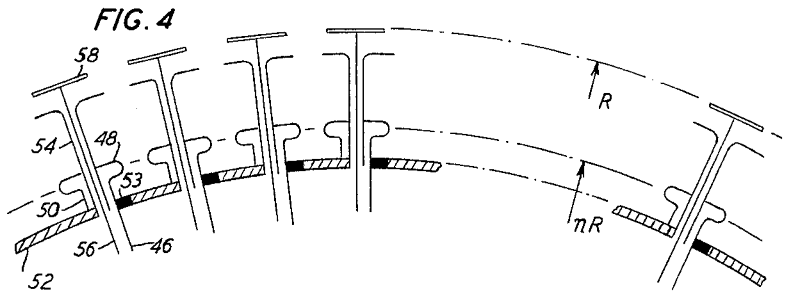
FIG. 4 depicts an antenna structure mounted on a curved surface to accommodate transmitted and received signals of different frequencies.

The two-bank arrangement in FIG. 7 with its cross connections between different antenna units of each antenna element, however, resembles the conventional Van Atta antenna and, accordingly, may be inconvenient in some applications. Therefore, the antenna arrangement of FIG. 4 may be utilized in curved arrays, where the antenna elements all point radially from some center point, to do away with awkward cross connections. In FIG. 4, the transmitting and receiving units are shown mounted coaxially on a surface 52 of the repeater at different radial distances R and $n$R, respectively, from a center point, where $n$ is defined as above and the transmitted frequency is again smaller than the received frequency. This, in turn, determines the distances between receiving units to be $n$ times the distances between transmitting units. The incoming electromagnetic wave is intercepted by a folded dipole antenna unit 48 and made available on a lead 46, insulated from surface 52 by a piece of dielectric 53. The other lead, 50, is grounded to surface 52. The transmitted signal is fed to a second antenna unit, coaxial with the first, consisting of an outer conductor 54 and a center conductor 56 extending outwardly and terminating in a perpendicular section 58. Outer conductor 54 is grounded at one end to body 52, extends outwardly through the center of folded dipole 48 and terminates in a right angle flare.

Figure 3:
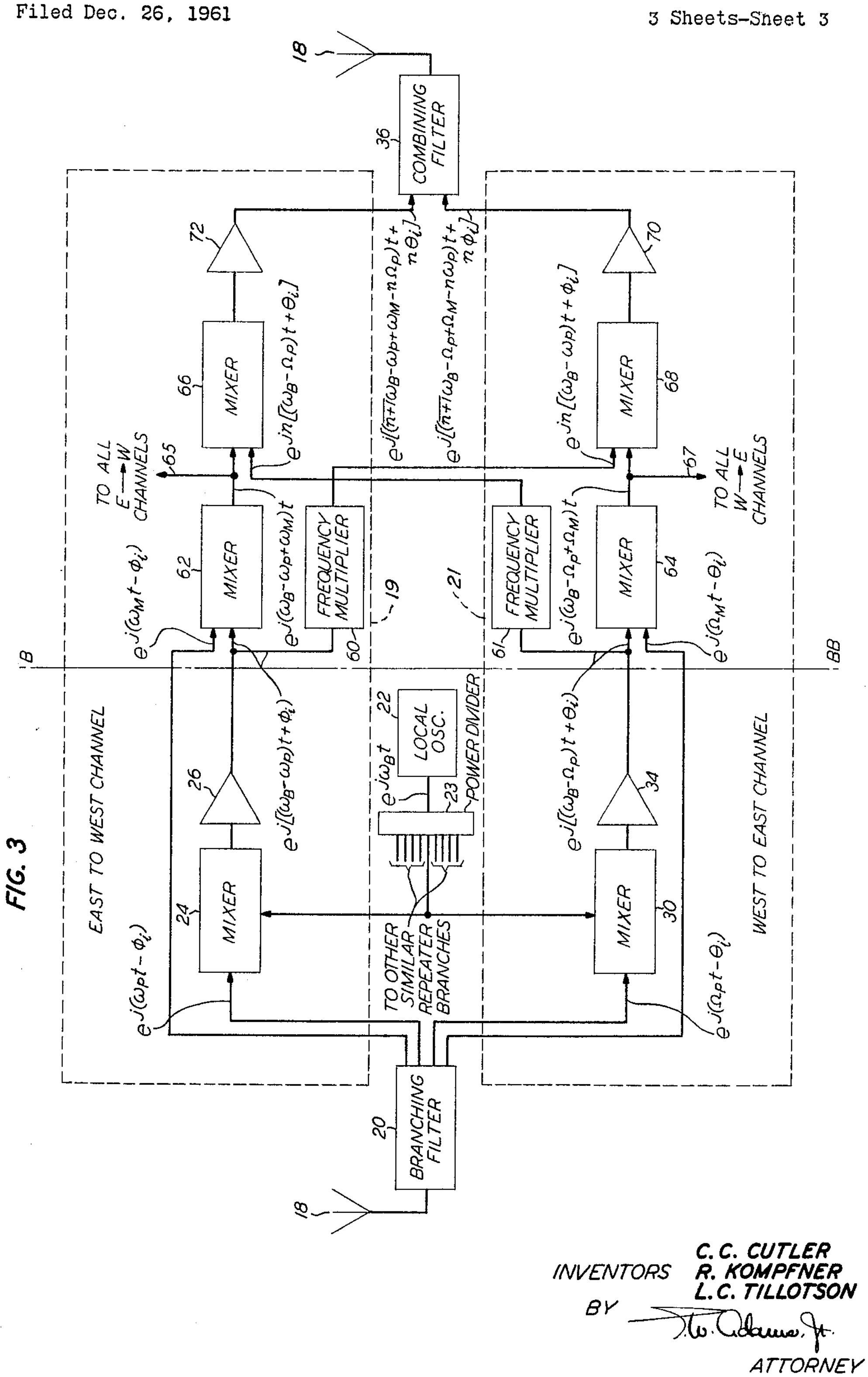

FIG. 3 discloses a repeater arrangement in which transmission and reception are accomplished at different frequencies without the need for scaling of the distance between separate transmitting and receiving units of each antenna element. Therefore, only one unit for each antenna element is required, this single unit performing both transmission and reception as in FIG. 1. In addition, this circuit configuration permits operation of repeater branches whose antenna elements lie outside of the field of mutual visibility of the east and west stations, which in a circular antenna array results in more efficient repeater operation. The repeater arrangement in FIG. 2, because it generates the signals to be retransmitted from beating signals derived from the received signals from both east and west stations in mixers 28 and 42, is limited to operation within the range of mutual visibility of both stations. The front portion of the repeater of FIG. 3, shown to the left of the line from B to BB, is identical to that of FIG. 2, so no further explanation thereof is needed.

The outputs of amplifiers 26 and 34 are applied to frequency multipliers 60 and 61, respectively, whose function it is to scale phase angles $\theta_i$ and $\Phi_i$ to permit transmission in the direction of reception. The equation on page — indicates that the phase angle is inversely proportional to the wavelength so frequency multipliers 60 and 61 multiply the phase and frequency of the applied signals by $n$, the ratio of received to transmitted signal wavelength. The ratio $n$ will generally be a noninteger in which case the frequency scaling can be accomplished by a multiplier stage and a divider stage connected in tandem with the multiplier being of the klystron type and the divider of the feedback type as shown in FIG. 12–20 (*a*) at page 382 of Pulse and Digital Circuits by Millman and Taub, McGraw-Hill Company, Inc., 1956. Phase degeneracy can be avoided in the process by loose coupling of the frequency multipliers of adjacent branches.

The outputs from amplifiers 26 and 34 are also applied to mixers 62 and 64, respectively. The output from mixer 62, represented by $$e^{i(\omega_B-\omega_p+\omega_m)t}$$

has no vestige of the direction of reception and is connected to the analogous point in all the east-to-west channels of the other repeater branches by a bus 65. This feature permits uniform transmission from all the array elements that are within the field of visibility of the station to which an information-bearing signal is to be transmitted whether or not they are also within the field of visibility of the other station. Bus 65 is connected to mixer 66 and the modulation sideband $$e^{i[(\overline{n+1}\omega_B-\omega_p+\omega_m-n\Omega_p)t+n\theta_i]}$$

is selected and amplified for retransmission by a narrow band amplifier 72, then applied to combining filter 36 for transmission to the west station on the same antenna unit 18 used to receive electromagnetic waves from the east station. As in FIG. 1 a diplexer, not shown, would be employed to prevent cross coupling of the transmitted and received signals. The output of mixer 64 in west-to-east channel 21 is similarly connected to the same point in all the west-to-east channels of the other repeater branches by a bus 67, and to a mixer 68. The modulation sideband $$e^{i[(\overline{n+1}\omega_B-\Omega_p+\Omega_m-n\omega_p)t+n\Phi_i]}$$

is separated from the output of mixer 68 and amplified for transmission in a narrow band amplifier 70 after which it is also applied to combining filter 36 for transmission from antenna unit 18.

It should be noted that the phase scaling feature and the feature eliminating the limitation of operation of only those repeater branches within the field of mutual visibility may be practiced independently. The former requires a pair of frequency multipliers 60 and 61 per repeater branch and the latter an additional pair of mixers 66 and 68 per repeater branch.

A terrestrial repeater station as conventionally employed in line-of-sight radio relay systems is represented in FIG. 5 as linking a west terminal station 95 and an east terminal station 97. The repeater station is shown mounted on top of a high pole or tower 92 to increase its range. Such repeater stations are subject to lateral movement due to deflections of the tower caused by environmental forces, thus requiring that the directionality of the antennas be relaxed unless space consuming and costly measures are taken to buttress the top of the tower. An additional problem encountered in the radio relay system is the initial alignment of the directional antennas of adjacent repeater stations so that efficient communication between them can be carried on. Both of the above problems are avoided by making use of the repeater of the invention. Accordingly, at the repeater a three-dimensional array is composed of an antenna bank 96 radiating and intercepting signals to and from east station 97 and an antenna bank 94 communicating with west station 95. Pairs of units, one from each of banks 94 and 96, each pair constituting an element of the array, are interconnected by repeater circuitry like that illustrated in FIG. 2. The output of amplifier 32 of each repeater branch like that of FIG. 2 can be connected to an antenna unit of bank 94 and the output of amplifier 44 can be connected to an antenna unit of bank 96, while the input to branching point filter 20 can be connected to both units of the pair. In this case all the antenna elements contribute to the over-all radiation pattern of the array with a total gain $G=mg$, where $m$ is the number of elements in the array and $g$ is the gain of each element. The over-all radiation pattern changes direction within the range of the element radiation pattern to compensate for variations in relative position of the repeater station, thus maintaining alignment with the remote station.

Figure 6A:
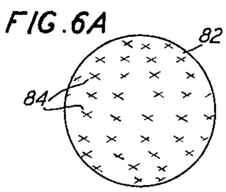
FIGS. 6A and 6B show distributions of antenna elements on a spherical surface.

FIG. 6*a* shows a spherical repeater station 82 having a plurality of antenna elements 84, each connected to the repeater circuitry illustrated in FIG. 2 or FIG. 3, distributed substantially uniformly over its surface. Such an arrangement lends itself particularly well to use as a space satellite communications repeater. The satellite body does not depend upon attitude stabilization in any form as a prerequisite to practicing highly directional antenna operation in communicating with a ground station. Regardless of the direction from which incoming electromagnetic waves impinge upon repeater station 82, they will be within the "potential" field of coverage of the repeater antenna system which is isotropic despite the fact that the antenna system retains directionality and the favorable characteristics thereof. In this antenna not all of the elements contribute to the antenna beam at once and, therefore, the over-all gain G is approximately equal to $m/g$ where $m$ is again the total number of antenna elements on the repeater, and $g$ is the gain of each antenna element. In this case, contrary to that of that of the array in FIG. 5, where all the array elements contribute to the antenna beam, small element gain is called for to achieve high over-all gain.

Figure 6B:
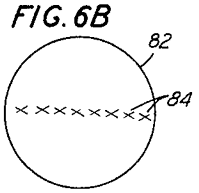
Figure 6C:
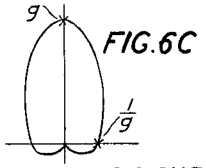
FIG. 6C illustrates the radiation pattern of the antenna elements of FIG. 6B.

In FIG. 6*b* antenna elements 84 are distributed in a chain around the circumference of spherical repeater station 82. Here "potentially" isotropic antenna performance as in FIG. 6*a* can be achieved by employing antenna elements each having a radiation pattern similar to that shown in FIG. 6*c*. The over-all gain G in the plane of the array is the same, $m/g$, as that determined above for the array in FIG. 6*a*. Likewise, in the direction perpendicular to the plane of the array, if the radiation pattern of each element is $l/g$, the over-all gain $G=m/g$ since all antenna elements, $m$ in number, contribute in this direction. The element radiation pattern may be chosen to give an over-all gain $G=m/g$ for intermediate directions as well. Such an element radiation pattern would resemble that shown in FIG. 6*c*.

The antenna system of the invention can be employed at terminal stations as well as at repeaters. For example, stations 95 and 97 in the terrestrial system depicted in FIG. 5 could be provided with the antenna system to further enhance the performance thereof as described above in connection with FIG. 5. The ground stations of a space communication system could also utilize the antenna system. The conventional horn reflector and parabolic dish antenna used at ground stations are limited in size and gain by the mechanical accuracy achievable in their construction. No such limitation is imposed upon the antenna system of the invention since it is composed of discrete elements, the relative placement of which is not critical. Such a terminal station could take the form of the embodiment of FIG. 1. The source of information to be transmitted to a repeater could be substituted for local oscillator 12 and the wave impinging upon the array from the repeater then guides the information in the direction to the repeater.

Another application of the antenna system and associated circuitry is in a fixed station to carry on intermittent communications with several fixed, remote stations at different locations, either alternately or simultaneously. In this case, directional transmission from one station to another station may be remotely controlled by a pilot signal transmitted from the other station.

Still another valuable application of the antenna system is in mobile radio systems where a mobile radio station is movable in location with respect to other fixed stations. Here directional transmission between stations can be carried out without advance knowledge of the movement of the mobile station or even the necessity for rotation of the antenna system of one station to engage the other stations.

What is claimed is:

1. In a communication system, a local source of signals and a plurality of individual stations for transmitting an electromagnetic wave in the direction to the source of an electromagnetic wave impinging upon said station, each of said stations comprising an antenna element, means for recovering the incoming wave, means for generating a signal for transmission which is of a phase with respect to said local signal equal in magnitude and opposite in sense to the phase of said recovered wave with respect to said local signal, means for multiplying in frequency said generated signal by the factor of ratio of frequency of transmitted wave to frequency of said incoming wave, and means for presenting said multiplied signal to said antenna element for radiation in combination with said other antenna elements in the direction of said incoming wave.

2. In a communication system, an array of antenna elements, a source of information-bearing electromagnetic waves for irradiating said array, combining means, a local oscillator, and apparatus individual to each of said antenna elements comprising means for recovering an information component and an unmodulated sine wave signal to serve as a pilot component from the portion of said wave impinging upon said antenna element, first means for mixing said pilot component with the output of said oscillator, second means for mixing said information component with the difference frequency modulation sideband produced by said first mixing means, and means for applying the sum frequency modulation sideband produced by said second mixing means to said combining means.

3. In a communication system, an array of antenna elements, a remotely-located source of electromagnetic waves for irradiating said array, a local oscillator, a source of signals to be transmitted toward said remotely-located source, and apparatus individual to each antenna element comprising means for recovering an unmodulated sine wave signal to serve as a pilot from the portion of said wave from said remotely-located source impinging upon said antenna element, first means for mixing said pilot with the output from said local oscillator, means for multiplying the frequency of the difference frequency modulation sideband produced by said first mixing means by a factor equal to the wavelength of said electromagnetic wave over the wavelength of the signal to be transmitted, second means for mixing the multiplied signal with the output from said source of signals, and means for applying the sum frequency modulation sideband of said second mixing means to said antenna element.

4. In a communication system, an array of antenna elements, a remotely-located source of electromagnetic waves for irradiating said array, a source of signals to be transmitted to said remote source, and apparatus individual to each antenna element comprising means for recovering an unmodulated sine wave signal to serve as a pilot from the portion of said wave from said remotely-located source impinging upon said antenna element, said pilot being of such phase that when mixed with the output of said source of signals a modulation sideband results that has a frequency different from the frequency of said wave from said remotely-located source and that constructively combines with modulation sidebands associated with the other antenna elements in the direction to said remote source upon radiation from said antenna element, means for mixing said pilot with the output of said source of signals, and means for applying said modulation sideband to said antenna element.

5. An antenna system as defined in claim 4 in which said antenna elements each have separate transmitting and receiving units, said receiving units being scaled in placement with respect to each other from the placement of said transmitting units with respect to each other in the ratio of the wavelength of said wave from said remotely-located source to said modulation sideband.

6. An antenna system as defined in claim 4 having said antenna elements distributed radially about a center point, each of said antenna elements comprising a transmitting unit and a receiving unit, each of said transmitting units being displaced from said center point a distance equal to the displacement of said receiving unit from said center point times the ratio of the frequency of said wave from said remotely-located source to the frequency of said modulation sideband.

7. An antenna system as defined in claim 4 in which said antenna elements each have separate transmitting and receiving units extending radially from a center point, said transmitting and receiving units of each of said antenna elements being coaxial with one another and displaced from said center point in the ratio of the frequency of the impinging wave to the frequency of the transmitted signal.

8. A communication system comprising a first station, a second station and a repeater station for relaying information between said first and said second stations, said repeater being subject to changes in orientation with respect to said first and said second stations, means for transmitting a first information signal from said first station to said repeater, means for transmitting a second information signal from said second station to said repeater, said repeater comprising a plurality of independent repeater branches, each comprising an antenna element, means for producing a first direction signal having a phase when radiated from said element combining with the signals radiated from the remaining of said elements in the direction to said first station, means for producing a second direction signal having a phase when radiated from said antenna element combining with the signals radiated from the remaining of said elements in the direction to said second station, means for recovering the information from said first signal in phase with the information from said first signal recovered in the remainder of said branches, means for combining the information from said first signal with said second direction signal, means for applying said combined signal to said antenna element for transmission to said second station, means for recovering the information from said second signal in phase with the information from said second signal recovered in the remainder of said branches, means for combining the information signal from said second signal with said first direction signal, and means for applying said last-named combined signal to said antenna element for transmission to said first station.

9. A radio repeater comprising a source of reference signals and a plurality of independent repeater branches, each designed to accommodate a first and a second information signal and comprising an antenna element, means for accepting electromagnetic waves impinging upon said antenna element, means for separating said first and second signals, means for separating said first and second information signals into information-bearing components and direction-indicating components, means for producing reverse direction-indicating components of equal and opposite phases from the phases of said direction-indicating components with respect to said reference signal, means for imparting the phases of said first and second reverse direction-indicating components to both said first and second information-bearing components, means for applying said first and second information-bearing components as modified by said last-named means to said antenna element to effect transmission of said first information-bearing component in the direction to the source of said second signal and of said second information-bearing component in the direction to the source of siad first signal.

10. A radio repeater as defined in claim 9 wherein said reverse direction-indicating components are multiplied in frequency in the ratio of the wavelength of the received signal to the wavelength of the transmitted signal prior to imparting their phases to said information-bearing components.

11. A communication system as defined in claim 8 wherein the information recovered from said first signal in all said repeater branches is commingled prior to combination with said second direction signal in each of said branches and the information recovered from said second signal in all said repeater branches is commingled prior to combination with said first direction signal in each of said branches.

12. A radio communications repeater for accommodating two-way transmission between first and second remote stations comprising a plurality of independent repeater branches and a local oscillator for common application to all said repeater branches, each of said repeater branches comprising an antenna element, means for separating signals received from said first and said second stations over said antenna element, means for producing an information-bearing component and an angle-indicating component for each of said received signals, means for beating each of said angle-indicating components with the output from said local oscillator, means for recovering the difference frequency modulation sideband produced by each of said beating means, means for beating each of said difference frequency sidebands with the information-bearing component from the same station and the difference frequency sideband from the other station, means for separating each modulation sideband produced by said last-mentioned beating means that has the phase relative to said local oscillator output of said difference frequency sideband from said other station, and means for applying each of said last-mentioned sidebands to said antenna element for transmission to said remote stations.

13. A radio communications repeater for accommodating two-way transmission between first and second remote stations comprising a plurality of independent repeater branches and a local oscillator for common application to all said repeater branches, each of said repeater branches comprising an antenna element, means for separating the signals received from said first and said second stations over said antenna element, means for producing an information-bearing component and an angle-indicating component for each of said received signals, means for beating each of said angle-indicating components with the output from said local oscillator, means for recovering the difference frequency modulation sidebands produced by said beating means, means for beating each of said difference frequency sidebands with the information-bearing component from the same station, means for combining each of the sum frequency modulation sidebands produced by said last-mentioned beating means with the same sideband from the same station from all of the remaining of said repeater branches, means for multiplying the frequency of each of said difference frequency sidebands in the ratio of the received signal to the wavelength of the transmitted signal of the station, means for beating each of said multiplied sidebands with said combined sideband from the other station, and means for applying each of the sum frequency modulation sidebands produced by said last-mentioned beating means to said antenna element for transmission to said remote stations.

References Cited by the Examiner

UNITED STATES PATENTS 3,036,210 5/1962 Lehan et al. -------- 343—100 X

CHESTER L. JUSTUS, *Primary Examiner.*

M. KRAUS, R. E. BERGER, *Assistant Examiners.*